May 1, 1951
C. W. CLELLAND
2,551,419
FILLING MACHINE FOR BAKERY PRODUCTS
Filed Jan. 18, 1947
2 Sheets-Sheet 1
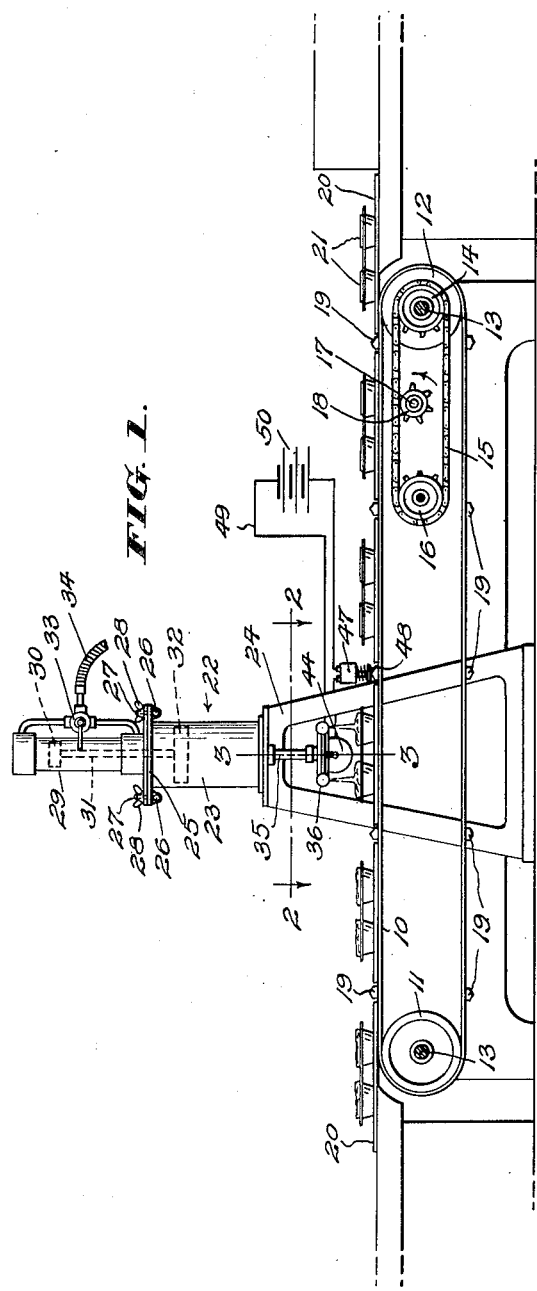
INVENTOR.
Charles W. Clelland
BY
W. D. McDowell May 1, 1951  C. W. CLELLAND  2,551,419
FILLING MACHINE FOR BAKERY PRODUCTS
Filed Jan. 18, 1947  2 Sheets-Sheet 2

Inventor
Charles W. Clelland

Attorney

Patented May 1, 1951

2,551,419

UNITED STATES PATENT OFFICE 2,551,419

FILLING MACHINE FOR BAKERY PRODUCTS

Charles Wilbur Clelland, Columbus, Ohio

Application January 18, 1947, Serial No. 722,877

3 Claims. (Cl. 226—99)

This invention relates to an improved machine for facilitating the operations of introducing filling materials into pans, the outer shells of cup cakes, pies and various other bakery products, or in operations in which coating or icing materials are applied to the outer surfaces of cakes or the like.

In most bakeries, it is an accepted practice to introduce filling materials into cup cakes, charlotte russe, and the like, by placing the outer shells of such products in trays and then manually introducing the filling materials into each of the shells prior to placing such products in an oven. These hand operations are slow, costly and laborious, and the amount of filling material introduced into the products varies so that considerable wastage is produced through the use of excess quantities of the filling materials over actual requirements.

Accordingly, it is an object of the present invention to provide a substantially automatic machine embodying a traveling conveyor adapted for the reception of trays or pans containing the shells of bakery products adapted to receive cream-like filling materials, and wherein provision is made for intermittently moving the conveyor so that one or more of such trays or pans may be brought into registration with ported outlet nozzles, and from which the filling materials are forced, under pressure, for deposit in the tray-carried shells.

It is another object of the invention to provide a filling machine for bakery products of the character set forth in which the ports of the nozzles, from which the filling materials are discharged under pressure, are opened and closed by electrically actuated valve means, the latter being under the control of the tray-moving conveyor, whereby to coordinate the operation of the valve means with the movement of the conveyor.

In connection with the foregoing objects, I have worked out a number of novel mechanical combinations and features of construction and which are described in the following specification and illustrated in the accompanying drawings:

In said drawings:

Fig. 1 is a side elevational view of a filling machine for bakery products formed in accordance with the present invention;

Fig. 2 is a horizontal sectional view taken on the plane indicated by the line 2—2 of Fig. 1;

Fig. 3 is a vertical transverse sectional view on the line 3—3 of Fig. 1;

Figure 4:
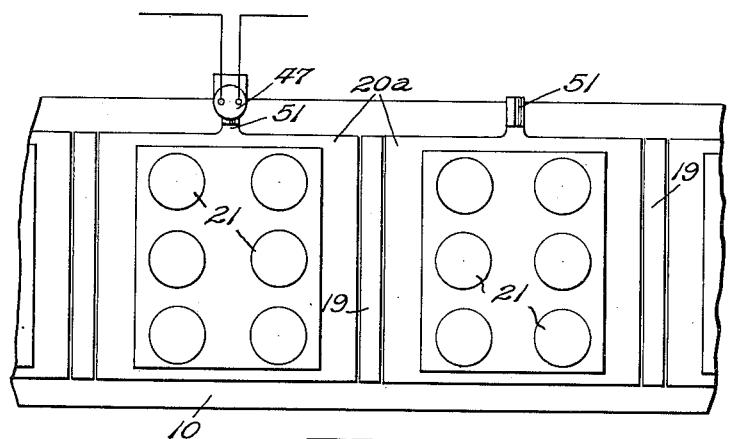
Fig. 4 is a fragmentary detail plan view of a tray formed with a switch-actuating extension.

Referring more particularly to the drawings, the numeral 10 designates an endless conveyor belt, the opposite ends of which are trained around guide and driving wheels 11 and 12, respectively, these wheels being carried by shafts 13 suitably journaled for rotation. The shaft of the driving wheel carries a sprocket 14, around which passes an endless chain 15, the latter also passing around a guide sprocket 16 suitably journaled in an appropriate frame structure for the conveyor belt 10. Between the sprockets 14 and 16, said frame structure rotatably supports a drive shaft 17, driven from any suitable source of power, and fixed to the shaft 17 is an interrupted toothed sprocket 18.

When the teeth of the sprocket 18 are in engagement with the links of the chain 15, motion is imparted to the chain 15 and through the sprocket 14 to the driving wheel 12 of the conveyor belt 10, causing the latter to move in unison with the chain 15. However, when the teeth of the interrupted sprocket 18 are out of engagement with the links of the chain 15, the latter and the conveyor belt 10 remain stationary. By these means, I provide an intermittent drive for the conveyor belt, causing the latter to move through desired increments of linear travel, and then for a predetermined interval to remain stationary. It will be understood, of course, that any other equivalent intermittent drive for the conveyor belt may be used.

The belt, in this instance, is provided with equidistantly spaced separate strips 19, which extend transversely across the outer faces of the belt. These strips form, in effect, pockets on the upper run of the belt for the reception of removable pans or trays 20, the latter being formed with cavities for the reception of the hollow outer shells 21 of cup cakes, or other similar bakery products in which filling materials are required to be introduced. As the belt is moved intermittently, each of these trays is presented and caused to dwell for a desired period in registration with a filler-introducing mechanism, indicated generally at 22.

In this instance, the mechanism has been shown as comprising a cylinder 23 supported stationarily on a frame member 24. The upper end of the cylinder is flanged, as at 25, and pivotally carries, as at 26, a plurality of bolts 27 carrying wing nuts 28. Clamped to the flanged upper end of the cylinder by the bolts and nuts 27 and 28, respectively, is the flanged lower end of a fluid motor head 29. Slidable in this head is a top piston 30, the latter carrying a depending piston rod 31 which, at its lower end, carries a lower piston 32 arranged for movement in the cylinder 23. Through the provision of a manually operated valve 33, a fluid, under pressure, is admitted selectively into either end of the motor head 29, thereby raising or lowering the pistons 31 and 32, as desired. The inlet of the valve 33 is connected with a flexible pipe line 34 leading to any suitable source, not shown, of fluid under pressure. Also, the valve 33 is of a standard type involving a port to the atmosphere to relieve pressures in the motor head on the advancing sides of the piston 30 to prevent undue compression of air therein when compressed air is used as the motivating fluid, as will be readily understood.

The cylinder 23 is adapted to be filled, when the head 29 is removed therefrom, with a filling material of a mobile paste or cream-like consistency, and this filling material is adapted to be expressed through a downwardly extending pipe 35 communicating with the bottom of the cylinder 23 when the piston 32 is forced downwardly. The lower end of the pipe 35 communicates with a substantially U-shaped, horizontally extending, nozzle structure 36, which is arranged over the belt 10, the filling material being forced through this nozzle structure and issues therefrom in regulated streams by way of spaced ports 37 provided at intervals in the bottom of the nozzle structure. It will be understood that the nozzle structure may contain any desired number of parallel legs, depending upon the number of rows of product-receiving cavities provided in each of the trays or pans 20. The ports 37 are so arranged that at least one thereof will be in registration with each of the tray cavities when a tray is in registration with the filler-introducing mechanism.

To open and close the ports 37, I may employ a sliding valve member of the type indicated at 38. This valve member comprises a central web 39 which carries a plurality of sleeves or collars 40 which are slidably mounted on tubular parallel legs of the nozzle structure, the ends of each sleeve or collar being beveled as at 41. One end of the web 39 is connected, as at 42, with the outer end of an armature 43 of a solenoid 44. The armature carries an abutment element 45 with which is engaged one end of a coil spring 46, the latter serving to move the valve member to a position so that its sleeves will cover the ports 37 when the field of the solenoid is deenergized.

In order to energize the solenoid field, and thereby move the valve member against the resistance of the spring 46 to a position opening the ports 37, use is made of a switch 47, which is stationarily mounted on the framework for the belt 10 adjacent to one side of the machine. The switch 47 includes a depending spring-pressed actuator 48, which is disposed in the path of movement of the separator strips 19. The field of the solenoid is arranged in an electric circuit 49, including a suitable source of energy 50, this circuit being closed when the actuator of the switch 47 is in contact with one of the separator strips 19.

Consideration of the foregoing will disclose that when fluid pressure is applied to the top of the piston 31, the latter will be forced downwardly in a controlled manner to expel filling material from the lower end of the cylinder 23. The operation of the intermittent drive for the conveyor belt is so regulated that when the belt comes to rest after a given amount of linear travel, one of the separator strips 19 will register with the switch actuator 48, causing closure of said switch and the circuit 49 in which it is contained. The closing of the circuit 49 engages the solenoid 44, causing the armature thereof to move against the resistance of the spring 46 and slide the valve member 38 to a position in which its sleeves or collars 40 uncover the ports 37, thus enabling the filling material to issue from said ports in a downward direction for deposit in the shells of the bakery products contained in the pans or trays 20. This filling operation continues until the intermittent drive mechanism again produces linear travel of the belt 10, at which time the switch 47 opens the circuit 49, deenergizes the solenoid 44 and causes the valve member, under the influence of the spring 46, to assume a position of port closure, thereby arresting outflow of the filling material from the nozzle structure when the conveyor belt is in motion.

Figure 5:
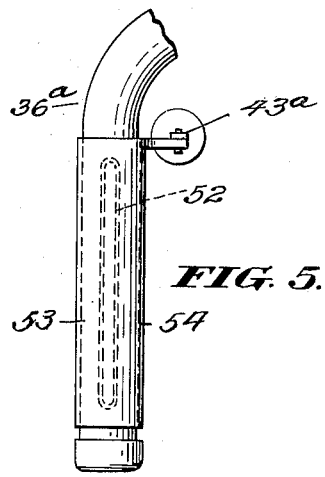
Fig. 5 is a view of one of the tubular members of the nozzle structure of the apparatus showing a discharge slot suitable for the emission of cake-icing materials.

As shown in Fig. 4, the switch 47 may be actuated by extension elements 51 formed on the sides of the bakery product-receiving trays 20a, instead of being actuated by the separating strips 19. By this arrangement, if for any reason a tray should be omitted in proper position on the conveyor belt, the valve mechanism will remain closed. In the application of icing compounds to cakes, the pipe 36a is provided with openings in the form of elongated slots, as indicated at 52 in Fig. 5, each slot being of a length approximately equivalent to that of the width measurement of a cake across its top. This slot may be opened or closed by a rotating sleeve 53 actuated by a solenoid control 43a. When the sleeve is rotated, one or more slots therein may be registered with the slot or slots in the pipe 36a.

It will thus be seen that I have provided an improved automatic machine for filling pan cavities with dough or other fillings, as in the production of rolls or cup cakes, although it may be used in the manufacture of larger cakes, sweetened breads or the like. The apparatus is adaptable to any type of pan or container in which a filling is employed of a semisolid consistency and where volume production is desired.

While I have described what I consider to be preferred forms of the present invention, nevertheless, it will be understood that the construction is subject to certain variation or modification without departing necessarily from the scope of the following claims.

I claim:

1. Filling apparatus comprising a conveyor adapted for the support of cavity-containing pans, means for imparting intermittent movement to said conveyor, a cylinder adapted for the reception of a filling material to be deposited in the cavities of the pans on the conveyor, a piston in said cylinder, means for imparting reciprocating movement to said piston, a conduit leading from said cylinder and through which the filling material is advanced upon movement of the cylinder piston in a given direction, said conduit terminating in a discharge extension arranged over said conveyor and the pans contained thereon, said extension being formed with discharge ports registering with the cavities in a pan disposed in registration with said extension, valve means movable on said extension for opening and closing said ports, electrically actuated means governing the operation of said valve means and including an operating circuit and a switch therefor, and spaced switch actuating devices movable in unison with said conveyor for automatically operating said switch.

2. Filling mechanism comprising a frame, an endless conveyor belt supported by said frame for movement in a horizontal plane, power-transmitting means imparting intermittent movement to said belt, transversely extending longitudinally separated spacers carried by said belt, said spacers receiving between them on the upper run of said belt removable cavity provided pans adapted for the reception of filling materials employed in the production of bakery products, a cylinder adapted to receive such filling materials, a conduit extending from one end of said cylinder and terminating in a ported extension arranged over said belt, positively acting means associated with said cylinder for forcibly expelling the materials therefrom for advancement thereof through said conduit and extension, movable valve means for opening and closing the ports of said extension, a solenoid having a movable armature, means uniting said armature with said valve means, spring means normally maintaining said valve means in positions of port closure when said solenoid is deenergized, an operating circuit for said solenoid, and a switch for opening and closing said circuit, said switch being formed with a movable actuator disposed in the path of movement of said separators, whereby said circuit is automatically opened and closed by the movement of the conveyor belt.

3. Filling mechanism comprising a frame, an endless conveyor belt supported by said frame for movement in a horizontal plane, power-transmitting means imparting intermittent movement of said belt, the upper run of said belt being adapted to receive for advancement in unison therewith a plurality of pans formed with cavities for the reception of filling materials employed in the production of bakery products, said pans being provided with laterally disposed switch-actuated elements, a cylinder adapted to receive such filling materials, a conduit extending from one end of said cylinder and terminating in a ported extension arranged over said belt, positively acting means associated with said cylinder for forcibly expelling the materials therefrom for advancement thereof through said conduit and extension, movable valve means for opening and closing the ports of said extension, a solenoid having movable armature, means uniting said armature with said valve means, spring means normally maintaining said valve means in positions of port closure when said solenoid is deenergized, an operating circuit for said solenoid, and a switch for opening and closing said circuit, said switch being formed with a movable actuator disposed in the path of movement of the trip elements of said pans, whereby to energize said solenoid when the pans are in vertical registration with said ported extensions.

CHARLES WILBUR CLELLAND.

REFERENCES CITED

The following references are of record in the file of this patent:

UNITED STATES PATENTS

| Number | Name | Date |
|---|---|---|
| 432,912 | Smith | July 22, 1890 |
| 784,202 | Berg et al. | Mar. 7, 1905 |
| 915,469 | Oestreicher et al. | Mar. 16, 1909 |
| 1,284,310 | Gilbert | Nov. 12, 1918 |
| 1,346,948 | Freedman | July 20, 1920 |
| 2,223,351 | De Francisci | Dec. 3, 1940 |
| 2,414,235 | MacManus | Jan. 14, 1947 |